United States Patent
Cullen et al.

(10) Patent No.: US 6,592,629 B1
(45) Date of Patent: *Jul. 15, 2003

(54) REMOTE DOCUMENT IMAGE STORAGE AND RETRIEVAL SYSTEM FOR A MULTIFUNCTIONAL PERIPHERAL

(75) Inventors: John Cullen, Redwood City, CA (US); Jonathan J. Hull, Cupertino, CA (US); Mark Peairs, Menlo Park, CA (US); Masayuki Nishimoto, Hatogaya (JP); Kiyoshi Suzuki, Tokyo (JP)

(73) Assignees: Ricoh Company, Ltd., Tokyo (JP); Ricohi Corporation, West Caldwell, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,640

(22) Filed: Nov. 13, 1997

Related U.S. Application Data

(63) Continuation-in-part of application No. 08/754,721, filed on Nov. 21, 1996, now Pat. No. 5,978,477.

(51) Int. Cl.⁷ .......................... G06F 15/00; G06F 15/16; G06F 17/00; G06F 17/21
(52) U.S. Cl. ....................... 715/530; 709/232; 382/305; 358/403
(58) Field of Search ................................ 707/530, 531, 707/532, 533, 534, 535, 536, 537, 203, 500, 501, 502, 503, 504, 505, 506, 507, 104; 705/33, 35; 382/209; 358/402; 709/232

(56) References Cited

U.S. PATENT DOCUMENTS

| | | | |
|---|---|---|---|
| 4,653,112 A | * 3/1987 | Ouimette | 382/128 |
| 5,168,444 A | * 12/1992 | Cuker et al. | 705/1 |
| 5,301,350 A | * 4/1994 | Rogan et al. | 705/33 |

(List continued on next page.)

FOREIGN PATENT DOCUMENTS

| | | |
|---|---|---|
| EP | 0 749 077 A2 | 12/1996 |
| EP | 0749077 A2 | 12/1996 |
| GB | 1 487 507 | 10/1977 |
| GB | 2 227 585 A | 1/1990 |
| GB | 2325544 A | 11/1998 |
| WO | WO 97/39411 | 10/1997 |

OTHER PUBLICATIONS

Valauskas, Edward et al., Kodak Picture Exchange, Online Incorporated, Oct. 1995, vol. 18, Issue 5, start p. 16.*

(List continued on next page.)

*Primary Examiner*—Joseph H. Feild
*Assistant Examiner*—William L. Bashore
(74) *Attorney, Agent, or Firm*—Blakely, Sokoloff, Taylor & Zafman LLP

(57) ABSTRACT

A document image storage system includes a control mechanism that automatically archives a document image in response to a document being produced by a peripheral device. The document image storage system also includes a memory machine and a remote storage facility coupled to the memory machine. The first memory machine archives document images. The remote storage facility archives document images received from the first memory machine. According to one embodiment, the memory machine and the remote storage facility are coupled via a communications channel. The communications channel transmits document images between the memory machine and the remote storage facility. According to a further embodiment, document image storage system includes a second memory machine coupled to the remote storage facility, the second memory machine also archives document images.

21 Claims, 8 Drawing Sheets

U.S. PATENT DOCUMENTS

| | | | | |
|---|---|---|---|---|
| 5,490,217 A | * | 2/1996 | Wang et al. | 380/51 |
| 5,515,490 A | * | 5/1996 | Buchanan et al. | 395/154 |
| 5,619,594 A | * | 4/1997 | Melen | 382/233 |
| 5,754,308 A | * | 5/1998 | Lopresti et al. | 358/403 |
| 5,784,610 A | * | 7/1998 | Copeland, III et al. | 707/104 |
| 5,895,455 A | * | 4/1999 | Bellinger et al. | 705/35 |
| 5,897,648 A | * | 4/1999 | Henderson | 707/530 |
| 5,915,038 A | * | 6/1999 | Abdel-Mottaleb et al. | 382/209 |
| 6,092,090 A | * | 7/2000 | Payne et al. | 707/530 |
| 6,246,778 B1 | * | 6/2001 | Moore | 382/103 |

OTHER PUBLICATIONS

Marshall, Patrick, EZ–Fax: A simple, low–cost alternative, InfoWorld Publications, Apr. 3, 1995, vol. 17, Issue 14, start p. 76.*

Bertino, Elisa et al., Query processing in a multimedia document system, ACM Transactions on Information Systems, vol. 6, Issue 1, pp. 1–41, Jan. 1988.*

* cited by examiner

REMOTE DOCUMENT IMAGE STORAGE AND RETRIEVAL SYSTEM FOR A MULTIFUNCTIONAL PERIPHERAL

This is a continuation-in-part application of application Ser. No. 08/754,721, entitled, "Automatic And Transparent Document Archiving", filed Nov. 21, 1996, U.S. Pat. No. 5,978,477.

FIELD OF THE INVENTION

The present invention relates generally to a document management system, and more specifically to providing remote storage and retrieval facilities for archiving electronic documents.

BACKGROUND

Traditionally, document management required that vast amounts of documents be shipped to storage facilities only to necessitate retrieval when needed. The result was an inordinate and unnecessary expense of both time and money. Recently, however, the cost of storing an image of a sheet of paper on digital media has become less than the cost of printing and storing the sheet of paper itself. This development is the result of the rapid development of storage system technology. Digital document storage systems, in addition, facilitate later electronic search and retrieval.

Managing conventional digital document storage systems may present several problems. Conventional document storage systems require that a user manually scan every document on a digital scanner in order to create an image of a document that may be archived in digital storage. Consequently, in order to archive a document, a scanner must be available to the potential user. Notwithstanding the availability of a scanner, a user must remember that a document needs to be scanned in order to create an archive. In addition, the scanning process may be time consuming if it is necessary to scan thousands of document pages.

Conventional storage systems may also have a problem with the amount of available capacity. Considering that no storage medium has an infinite capacity, additional storage may be necessary to store all of the information that an individual wishes to store. For some user applications, where space is limited, it would eventually become impracticable to continuously add storage mediums for archiving digital documents. Furthermore, if the primary storage mediums are damaged, valuable archived information may be lost.

The present invention provides a practical and efficient method for extending the storage capacity in a computer system to facilitate archiving documents.

SUMMARY OF THE INVENTION

A document image storage system includes a control mechanism that automatically archives a document image in response to a document being produced by a peripheral device. The document image storage system also includes a memory machine and a remote storage facility coupled to the memory machine. The first memory machine archives document images. The remote storage facility archives document images received from the first memory machine. According to one embodiment, the memory machine and the remote storage facility are coupled via a communications channel. The communications channel transmits document images between the memory machine and the remote storage facility.

BRIEF DESCRIPTION OF THE DRAWINGS

The present invention is illustrated by way of example and not limited to the figures of the accompanying drawings in which.

DETAILED DESCRIPTION

Figure 1:
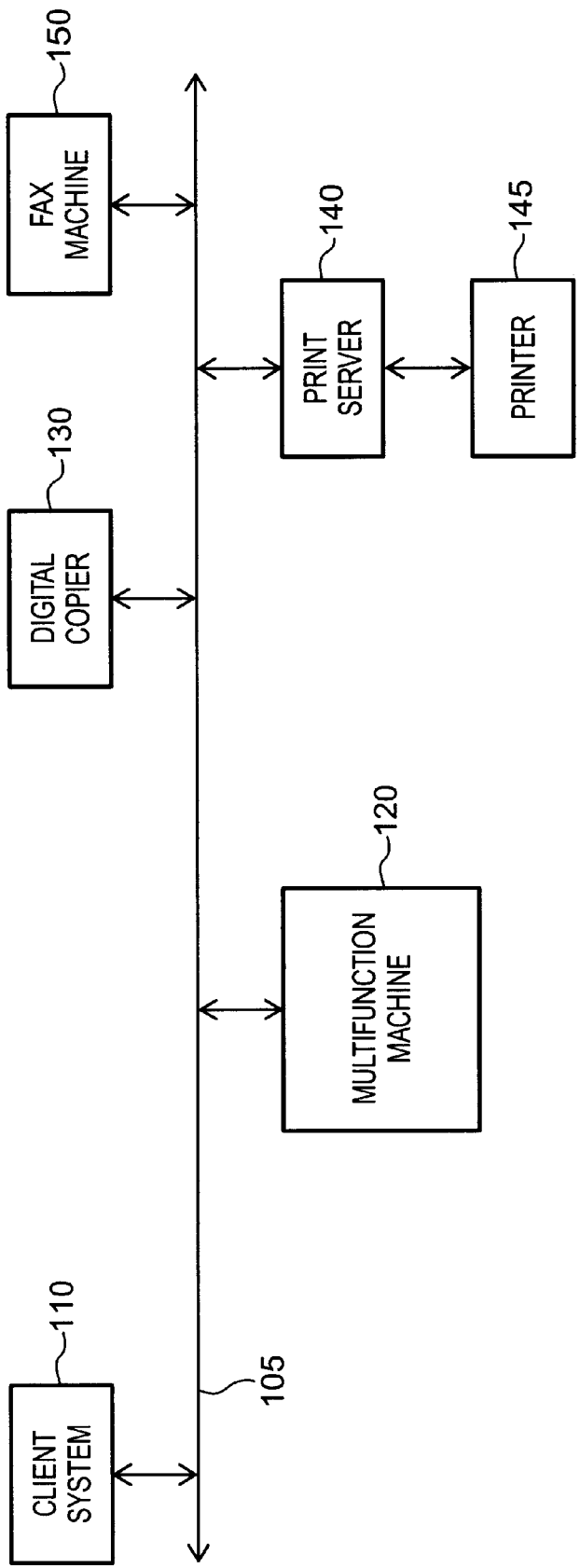
FIG. 1 illustrates one embodiment of an office machine network according to the present invention.

According to one embodiment of the present invention, document images are automatically saved on a mass storage medium in a multifunction machine as a result of copying, faxing, printing, or other transfer or manipulation of documents. Document images on the multifunction machine are copied to a remote storage facility over a communications channel, thereby facilitating infinite storage for the multifunction machine. The remote storage facility provides a data warehouse in which customers may store and retrieve digital documents.

An apparatus and method for document and data storage is described. In the following description, numerous details are set forth, such as specifies number of signals, types of data and storage formats, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions described below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also as discussed below, the present invention relates to apparatus for performing the operations herein. This apparatus may be specially constructed for the required purposes, or it.may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMS, magnetic or optical cards, or any type of media suitable for storing electronic instructions, and each coupled to a computer system bus. The algorithms presented herein are not inherently related to any particular computer or other apparatus. Various general purpose machines may be used with programs in accordance with the teachings herein, or it may prove convenient to construct more specialized apparatus to perform the required steps. The required structure for a variety of these machines will appear from the description below. In addition, the present invention is not described with reference to any particular programming language. It will be appreciated that a variety of programming languages may be used to implement the teachings of the invention as described herein.

FIG. 1 illustrates an office machine network 100. According to one embodiment of the present invention, office machine network 100 performs automatic document archiving. Office machine network 100 includes a bus 105 for communicating information. According to one embodiment, bus 105 may comprise an Ethernet network. However, in alternative embodiments, bus 105 may comprise other types of networks or combinations of networks. Bus 105 may be or include a bus in a personal computer.

Office machine network 100 may also include a representative client system 110 coupled with bus 105. Client system 110 may provide access to office machine network 100 for a system user. Office machine network 100 further includes a multifunction machine 120 coupled to bus 105. Multifunction machine 120 archives document image data transmitted from, by, or to a digital copier, facsimile machine, printer, or other similar document transfer or reproduction device. Document image data may comprise any electronic form of written, printed, or similarly expressed information. According to one embodiment, multifunction machine 120 may comprise a computer system. Multifunction machine 120 is discussed in further detail below.

In addition, office machine network 100 may include a digital copier 130 coupled to bus 105 for copying documents. Copier 130 may transmit image data obtained during the course of copying a document. Further, office machine network 100 may include a print server 140 coupled to bus 105, and a printer 145 coupled to print server 140. Print server 140 controls printing of documents by printer 145 at the request of client system 110. Print server 140 may also transmit image data. Additionally, office machine network 100 may include a facsimile (fax) machine 150 coupled to bus 105 for sending and receiving documents. Similarly, fax machine 150 may transmit or receive image data obtained during the course of sending or receiving documents, respectively.

Note that office machine network 100 may include other input and output devices capable of transmitting and/or receiving documents.

According to one embodiment, office machine network 100 may automatically archive a document image into multifunction machine 120 each time a document is copied, faxed or printed. In response to a command by a system user (i.e., a request to copy, print, or fax), a document is produced by the applicable peripheral device (e.g., copier, printer, fax machine, an input device, an output device, etc.). According to one embodiment, copier 130 includes a data tap, a scanner and a print engine. The scanner captures an image of a document and transmits the image to the print engine for printing. The data tap monitors the document data path of copier 130 in order to capture image data of a document that has been scanned and transmitted to the print engine. After capturing the data, the data tap transmits the image data to the copier 130 print engine, as well as a controller within copier 130. The transmission of data to the controller is transparent to the conventional operations of copier 130. The controller then transmits the image data to multifunction machine 120 via bus 105. Fax machine 150 also includes a data tap, scanner, print engine and controller that operate similarly to copier 130. In such an instance, the data tap transmits image data to the controller within fax machine 150, in addition to a modem, after a document has been scanned. According to a further embodiment, print server 140 runs spooling software for writing to printer 145. The spooling software enables print server 140 to transmit image data to multifunction machine 120 after it is transmitted.to printer 145. Note that other devices may use similar spooling software to enable capture of a copy of an electronic version of a hardcopy document being transferred or generated.

According to one embodiment, the document data is converted into an image format (e.g., postscript, GIFF, TIFF, etc.) as the document is being produced (e.g., in the print server, copier, or fax machine). However, in an alternative embodiment, the document data may be converted into an image format after being transmitted to multifunction machine 120. Such conversion may be performed by conversion hardware, software, or a combination of both, inside or outside of multifunction machine 120.

According to a further embodiment, each peripheral device includes an origination identifier in each packet of image data that is transmitted over bus 105 to multifunction machine. 120. The origination identifier indicates from which device the data was transmitted. In addition, the image data transmitted from the peripheral devices further includes a destination identifier that indicates the destination of the data (e.g., multifunction machine 120).

The process of automatically archiving documents is further described in U.S. application Ser. No. 08/754,721, entitled "Automatic And Transparent Document Archiving", filed Apr. 21, 1997, and assigned to the assignee of the present invention.

Figure 2:
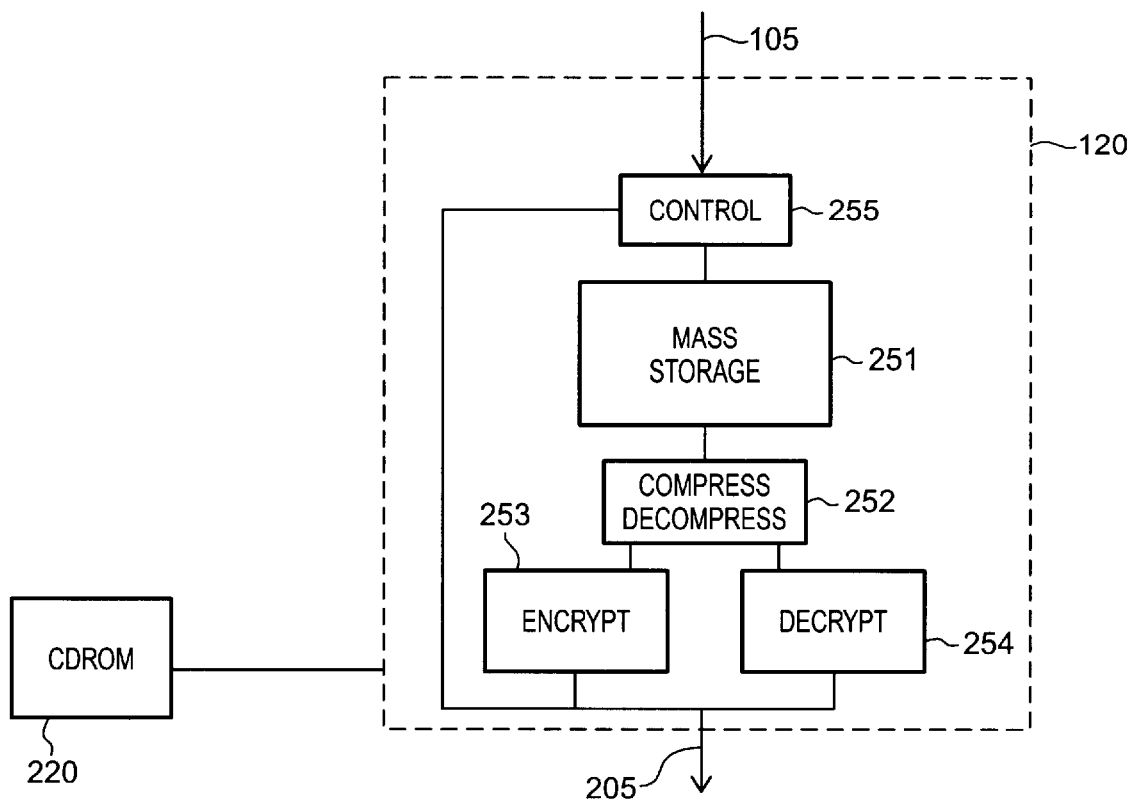
FIG. 2 illustrates a multifunction machine according to one embodiment of the present invention.

FIG. 2 illustrates one embodiment of multifunction machine 120 according to the present invention. Multifunction machine 120 includes a control module 255 that retrieves data from bus 105 that is addressed to multifunction machine 120. Control module 255 monitors bus 105 and compares the destination identifier included in the data with the address of multifunction machine 120. If a match occurs, control module 255 captures the data. In addition, control module 255 may initiate the retrieval of a document image from a remote storage facility to be forwarded to multifunction machine 120.

Further, multifunction machine 120 includes a mass storage medium 251 coupled to control module 255 for storing document image data. According to one embodiment, mass storage medium 251 may comprise a magnetic disk. However, in alternative embodiments, an optical disk, or other storage mechanism, such as, for example, those described above, may be used to implement mass storage medium 251.

In one embodiment, multifunction machine 120 includes a compression/decompression module 252 coupled to mass storage medium 251. Compression/decompression module 252 compresses document image data before the data is transmitted from multifunction machine 120 to a remote storage facility, other storage, or other location. Compression/decompression module 252 may be utilized in order to reduce overall storage space. According to one embodiment, compression/decompression module 252 may perform any number of compression techniques, such as Lempel-Ziv, Commite' Consultatif International de Telecommunication et Telegraphy (CCITT), Joint Photographic Expert Group (JPEG), Compression with Reversible Embedded Wavelets (CREW), run length encoding, etc. Compression/decompression module 252 may also decompress data received by multifunction machine 120 from a remote storage facility or other location. One of ordinary skill in the art will appreciate that the inclusion of compression/decompression module 252 in multifunction machine 120 is not necessary to practice the present invention.

Multifunction machine 120 may further include an encryption module, such as encryption module 253, coupled to compression/decompression module 252. Encryption module 253 encrypts document image data that is to be transmitted from multifunction machine 120. Encryption module 253 may be included to secure document images transmitted from multifunction machine 120 so that they are accessible only to selective individuals or users, such as those using office machine network 100. Encryption module 253 may perform one or more of a variety of encryption techniques. In one embodiment, encryption module 253 uses an encryption code or key to identify an individual to whom the image data belongs before it is transmitted from multifunction machine 140.

Additionally, multifunction machine 120 may include a decryption module 254 coupled to compression/decompression module 252 for decrypting document image data received at multifunction machine 120. One of ordinary skill in the art will appreciate that encryption module 253 and decryption module 254 are not necessary to practice the present invention.

In one embodiment, both encryption module 253 and decryption module 254 are coupled to a communication channel 205. Communication channel 205 transmits and receives document image data to and from a remote storage facility respectively. According to one embodiment, communication channel 205 may comprise a Wide Area Network (WAN) coupling multifunction machine 120 and a remote storage facility. In alternative embodiments, however, multifunction machine 120 may communicate with a remote storage facility using other techniques (e.g., ISDN, internet, via modem, etc.).

According to one embodiment, multifunction machine 120 may be coupled to a recordable CDROM 220. CDROM 220 provides external storage to ensure that a local copy of document image exists. Multifunction machine 120 may record to CDROM 220 upon receiving each document image from bus 105. However, in alternative embodiments, multifunction machine 120 may copy to CDROM 220 at predetermined intervals (e.g., every hour, day, etc.). According to a further embodiment, document images may be copied to CDROM 220 whenever the use of multifunction machine 120 is low (e.g., when office machine network 100 is least frequently used). In such an embodiment, multifunction machine 120 may maintain a record (or history) of usage for a predetermined amount of time (e.g., weeks, months, years, etc.). Based upon the history, multifunction machine 120 could determine the best time to download to CDROM 220. The best time may be chosen based on a histogram generated by multifunction machine 120 using the recorded history data.

Figure 3:
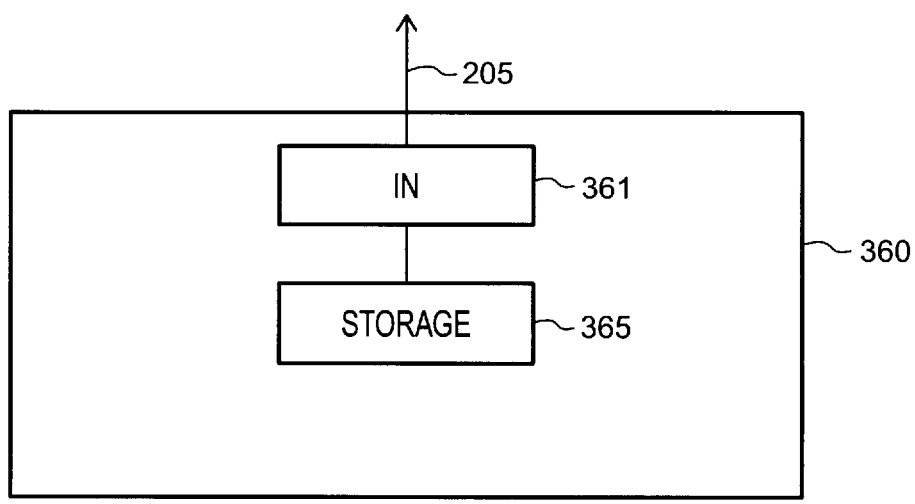
FIG. 3 illustrates a remote storage facility according to one embodiment of the present invention.

FIG. 3 illustrates one embodiment of a remote storage facility (RSF) 360 according to the present invention. RSF 360 includes a storage medium 365. According to one embodiment, storage medium 365 may be a magnetic storage device. However, in alternative embodiments, medium 365 may be an optical, tape, or other type of storage devices, such as, for instance, those described above. RSF 360 functions as a data warehouse facility that includes much greater storage capacity than can be accommodated by multifunction machine 120. Consequently, RSF 360 may provide access to multifunction machine 120 for the storage of documents. According to another embodiment, RSF 360 may comprise a hierarchical storage system.

RSF 360 may also include an Image Notarization (IN) module 361. IN module 361 notarizes images that are received by RSF 360. In such an embodiment, RSF 360 may register the time and date a particular image datum was received from a particular multifunction machine 120. The time and date information is subsequently archived with the image datum in the various storage mediums. IN module 361 may also transmit the notarization information to multifunction machine 120 upon document retrieval. Consequently, a reliable record is kept for each document archived in RSF 360. In an alternative embodiment, time stamps may be used to label each image as it is received at RSF 360.

Figure 4:
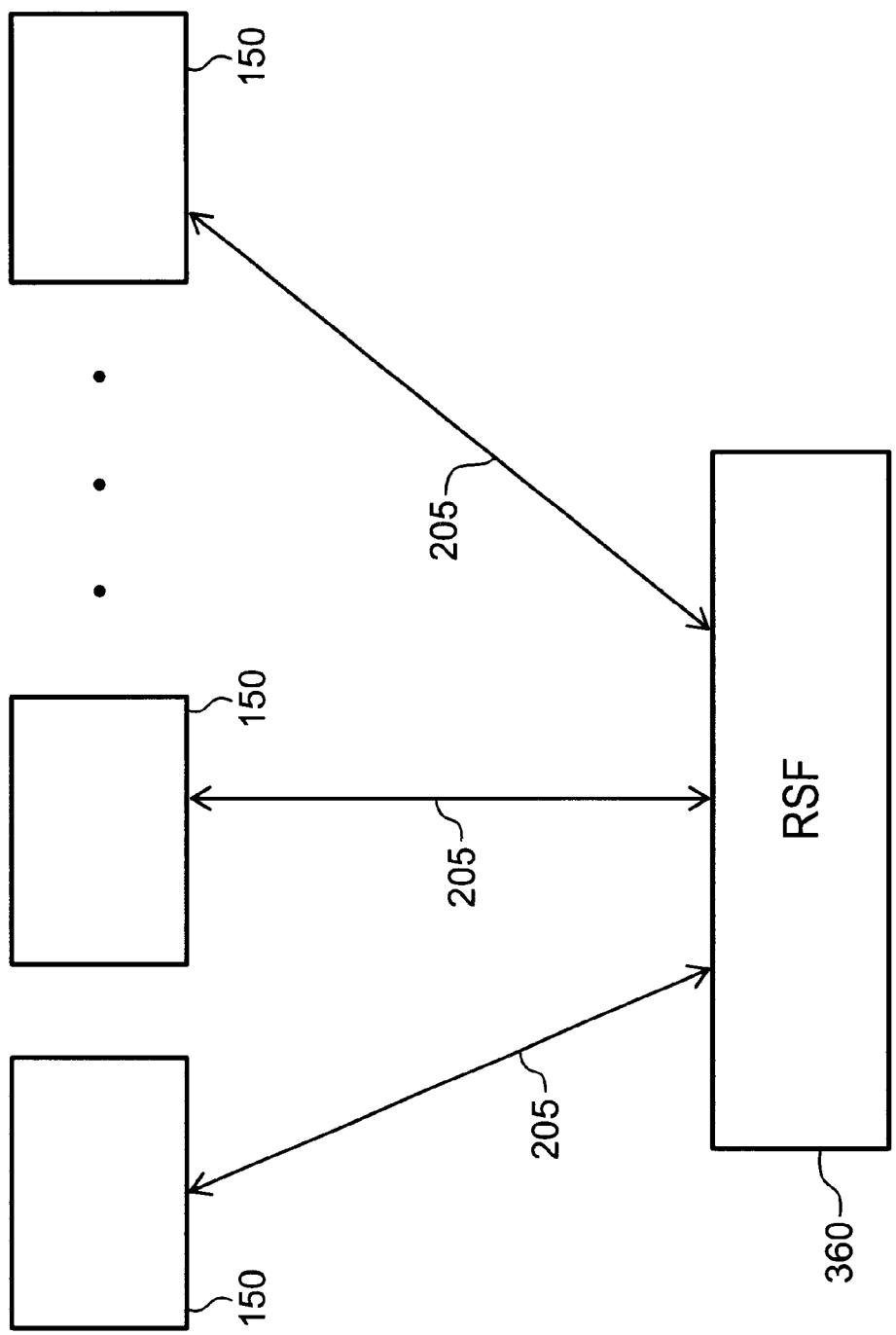
FIG. 4 illustrates one embodiment of a remote storage system according to the present invention.

FIG. 4 illustrates a remote storage system wherein RSF 360 may provide storage services for a plurality of multifunction machines. In one embodiment, access to each multifunction machine may be provided to RSF 360 via separate communications channels. In an alternative embodiment, a single communications channel is used with arbitration logic to control access to the channel. This arbitration logic may be either in one or all multifunction machines, as a separate device or a part of RSF 360. Each multifunction machine 120 may be included within a separate office machine network 100.

Figure 5:
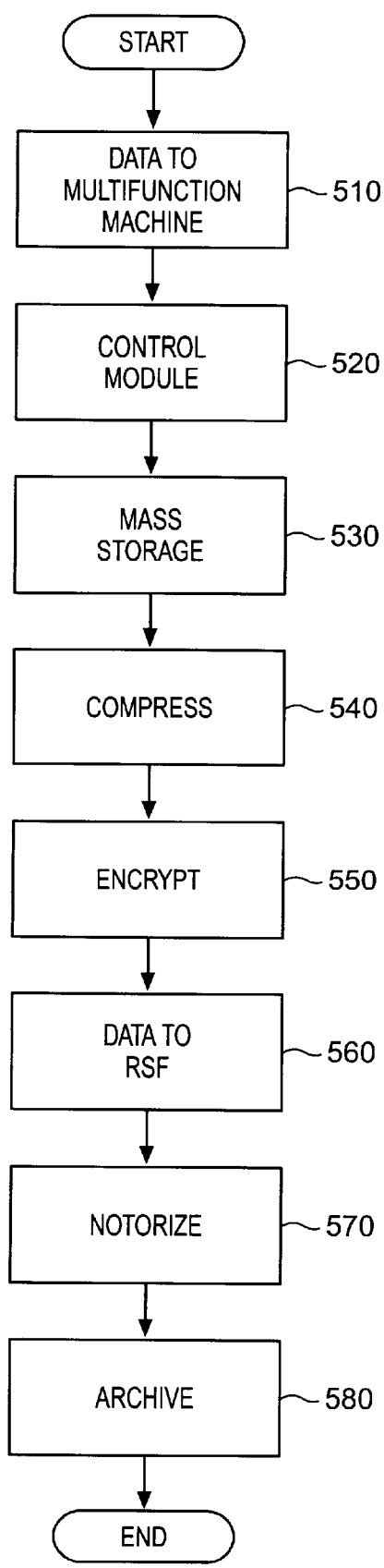
FIG. 5 illustrates a flow diagram for archiving document image data in the remote storage system.

Now referring to FIG. 5, a flow diagram for archiving document image data according to the present invention is illustrated. As described above, multifunction machine 120 may archive document image data transmitted from copier 130, print server 140 or fax machine 150. Upon the request to produce a document in office machine network 100 (i.e., a copy, fax or printed), image data of the document is transmitted to multifunction machine 120 along with an origination and destination identifier, step 510. At step 520, control module 255 matches the destination identifier included in the image data with the address of multifunction machine 120, thus capturing the data. Next, document image data is archived in mass storage medium 251, step 530.

According to one embodiment, multifunction machine 120 may transmit image data to RSF 360 immediately after it is stored to mass storage medium 251. Consequently, at step 540, the image data is transmitted to compression/decompression module 252 where it is compressed. Next, the image data is transferred to encryption module 253 for encryption, step 550. Encryption module 253 secures the images stored at the RSF 360 so that they are not accessible to other customers or to RSF operators. At step 560, the image data is transmitted to RSF 360. Note that if compression/decompression module 252 and encryption module 253 are not included, the image data, is transmitted immediately to RSF 360. At RSF 360, the image data is optionally notarized by IN 360, step 570. Finally, the image data is archived in storage medium 365, step 580.

In alternative embodiments, multifunction machine 120 may transmit image data to RSF 360 at predetermined intervals (e.g., every hour, day, etc.). In such an embodiment, image data is transferred to compression/decompression module 252 upon receiving a command from control module 255 to transmit data to RSF 360, step 540. Subsequently, steps 550–580 are carried out, as illustrated above. In yet another embodiment, the remote storage system may operate in either of the above mentioned modes of operation.

According to a further embodiment, multifunction machine 120 may transmit image data to RSF 360 whenever the use of office machine network 100 is low. In such an embodiment, multifunction machine 120 maintains a history of usage for a predetermined amount of time (e.g., weeks, months, years, etc.). In one embodiment, based upon the history, multifunction machine 120 may determine the best time to transmit image data to RSF 360, such as by generating a histogram of the usage from the recorded history and using the histogram to make the determination.

Figure 6:
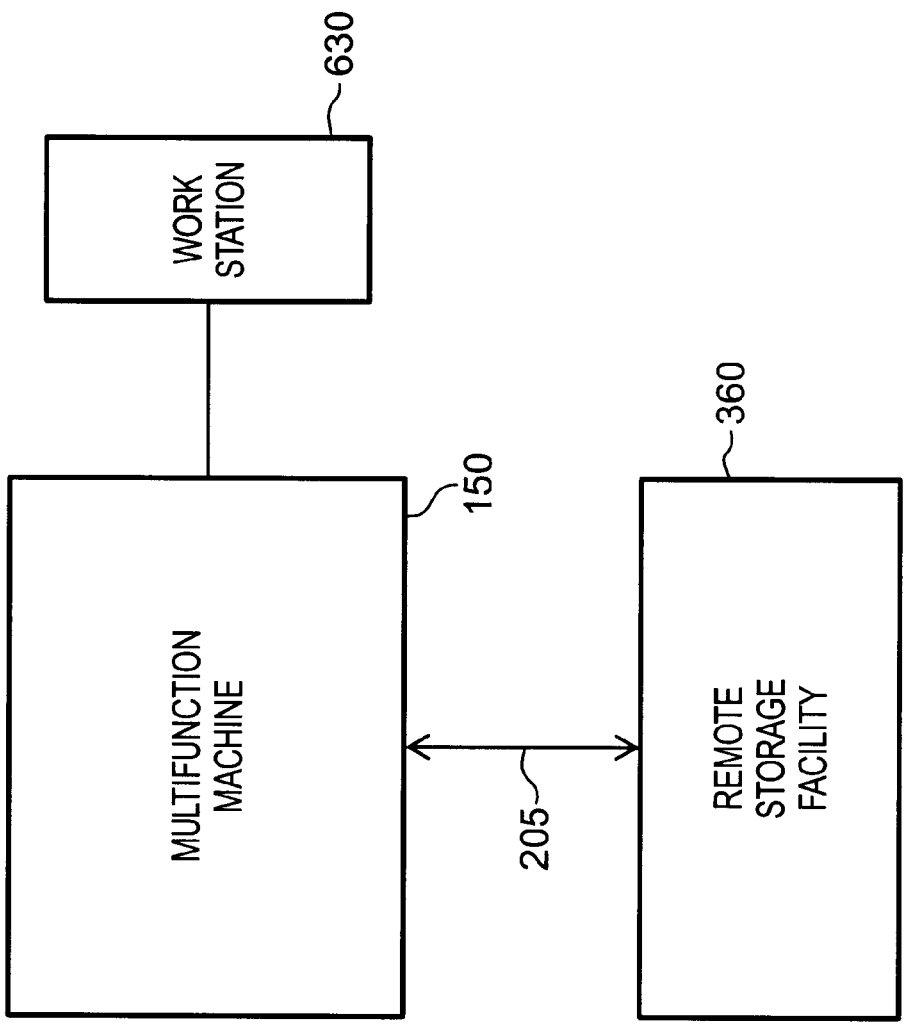
FIG. 6 illustrates an alternative embodiment of a remote storage system according to the present invention.

FIG. 6 illustrates an alternative embodiment of a remote storage system in which a workstation 630 is coupled to multifunction machine 120. Workstation 630 may be coupled to multifunction machine 120 by bus 105. However, one skilled in the art will recognize that workstation 630 may be coupled to multifunction machine 120 in other ways, such as parallel or serial interfaces, or Ethernet or other networks. According to one embodiment, workstation 630 enables the retrieval of a document from multifunction machine 120 or RSF 360. Workstation 630 may provide an interface to all documents that have ever been copied, printed, faxed, or otherwise transmitted in office machine network 100. The interface allows a user to access any or all of the archived documents. The interface may enable access to the time and/or date the document was archived. The interface may also enable access to the application or server that transmitted the information that was captured for archiving.

In one embodiment, an index table stored in workstation 630 indicates the location of all archived document images. However, since storage space is limited on multifunction machine 120, only a subset of the index of document images may be actually archived in multifunction machine 120 at any given time. Images not present in multifunction machine 120 are available in RSF 360. However, this may not be visible to the user. A retrieval request for a document stored remotely in RSF 360 generates a request at control module 255 for the document to be transferred from RSF 360 to multifunction machine 120.

According to one embodiment, a least recently used (LRU) algorithm may be implemented to determine which images are kept in mass storage medium 251 of multifunction machine 120. In such an embodiment, the archived document that has been accessed the least is forwarded to RSF 360 at regular intervals, or at times when another document is being archived. An indication or count may be stored for each document to indicate how often it has been accessed. In alternative embodiments, other algorithms may be implemented to determine which images are kept in multifunction machine 120 (e.g., least frequently used (LFU)).

Figure 7:
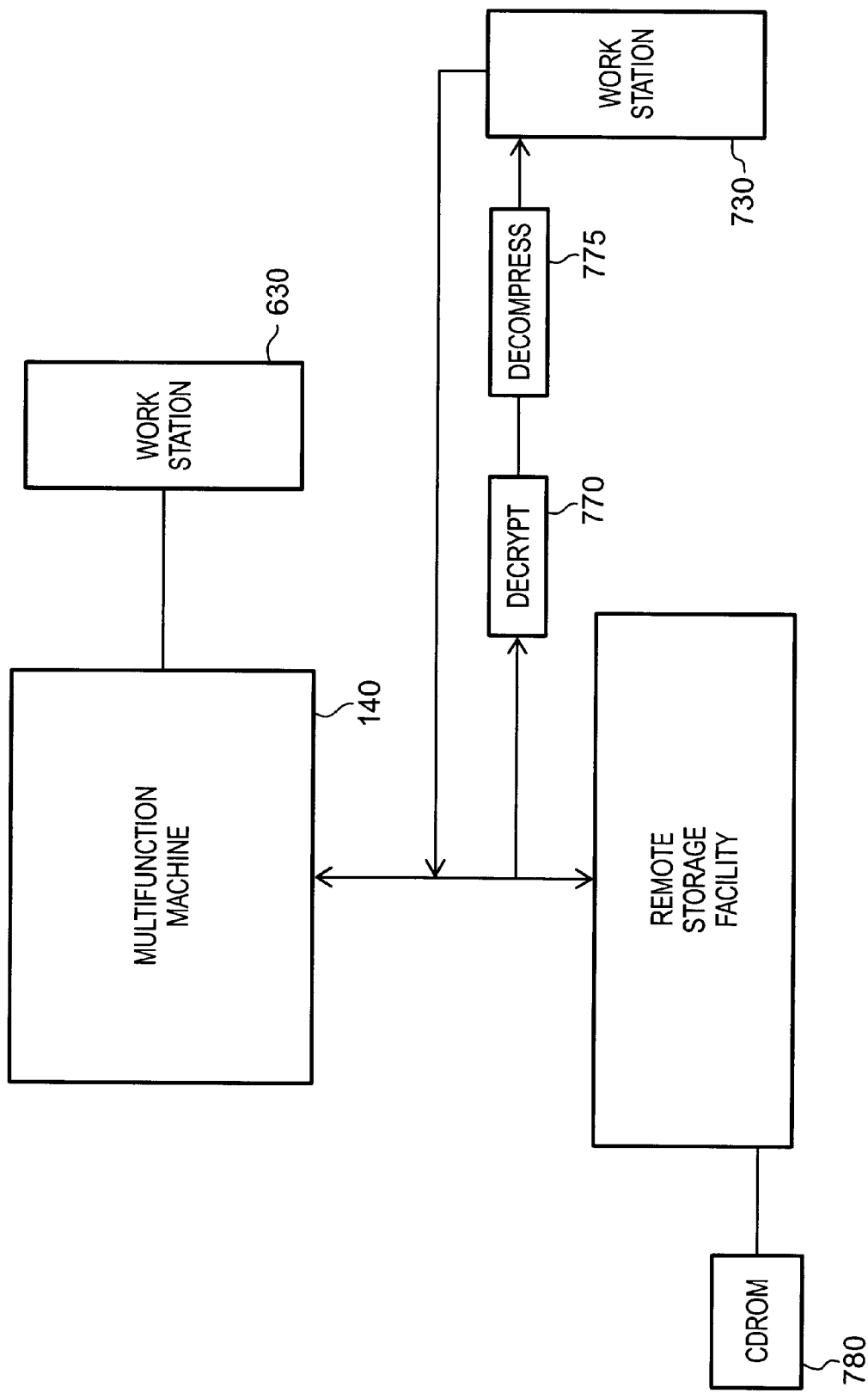
FIG. 7 illustrates yet another embodiment of a remote storage system according to the present invention.

FIG. 7 illustrates an alternative embodiment of a remote storage system in which a workstation 730 is coupled to RSF 360. Workstation 730 may be coupled to RSF 360 by communications channel 205. However, in alternative embodiments, workstation 730 may be coupled to RSF 360 by a separate communications channel. A decrypt module 770 may also be coupled to RSF 630 for decrypting document images received from RSF 360. Further, a decompression module 775 may be coupled to workstation 730 for decompressing document compressed document images received from RSF 360.

Workstation 730 may also use an index table. According to one embodiment, all document images are present in RSF 360. In such an embodiment, workstation 730 may not need to access multifunction machine 120. However, in an embodiment in which images are transferred from multifunction machine 120 to RSF 360 at predetermined intervals, workstation 730 may retrieve document images from multifunction machine 120 that have not been previously transferred to RSF 360. A retrieval request for a file archived in RSF 360 generates a request for the document to be transferred from RSF 360 to workstation 730 through decrypt module 770 and decompression module 775. In an alternative embodiment, however, a retrieval request may generate a request for a document to be transferred to either workstation 730 or multifunction machine 120 for storage.

A recordable CDROM 780 may also be coupled to RSF 360. CDROM 780 may store document images for each multifunction machine user downloaded from RSF 360. CDROM 780 could subsequently be redistributed to each individual user.

Figure 8:
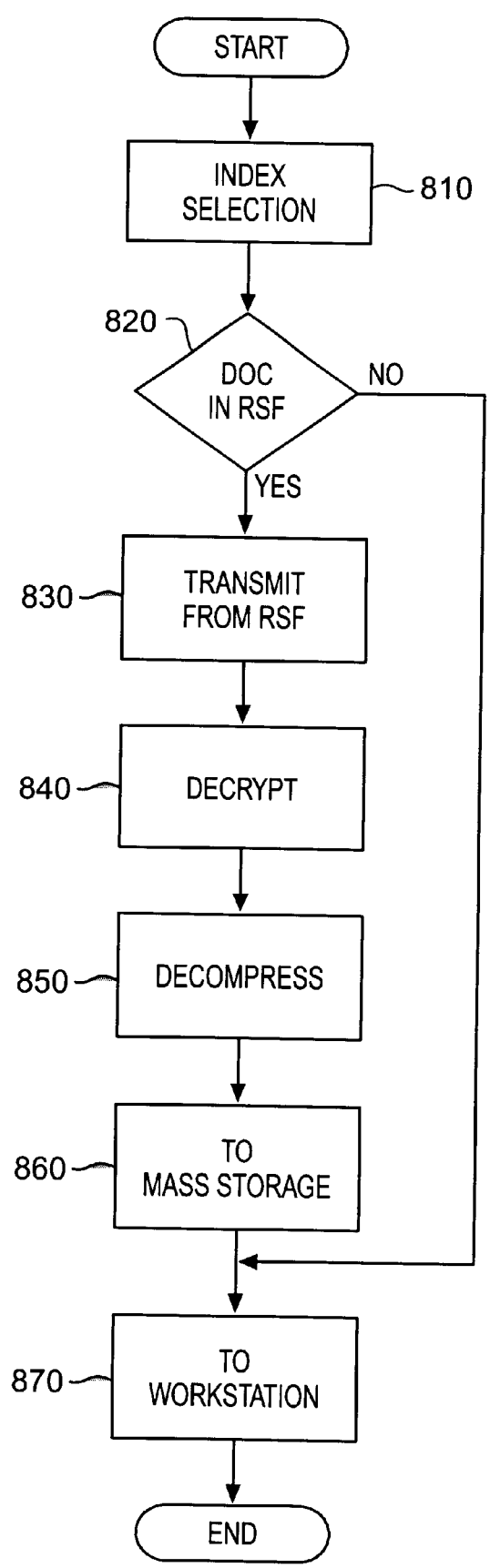
FIG. 8 illustrates a flow diagram for retrieving document image data according to one embodiment of the present invention.

FIG. 8 illustrates a flow diagram for the document retrieval process implemented by workstation 630. As described above, an index table stored in workstation may indicate the location of all archived document images. The index table permits a user to select a document to be retrieved from either multifunction machine 120 or RSF 360. To retrieve a document, a user may retrieve a document by making a selection from the index, step 810. Next, a determination is made as to whether the selected document is located in RSF 360, step 820.

If the requested document is archived in RSF 360, control module 255 causes the pertinent image data to be transmitted from RSF 360 to multifunction machine 120, step 830. At step 840, the image data is decrypted at decryption module 254. Next, the image data is transmitted to compression/decompression module 252 where it is decompressed, step 850. At step 860, the image data is written to mass storage medium 251. Subsequently, the requested document is forwarded to workstation 630 where it may be viewed by the user, step 870. If the requested document is not archived in RSF 360, it is located in multifunction machine 120. Consequently, the document is forwarded directly from mass storage medium 251 to workstation 630, step 870.

Figure 9:
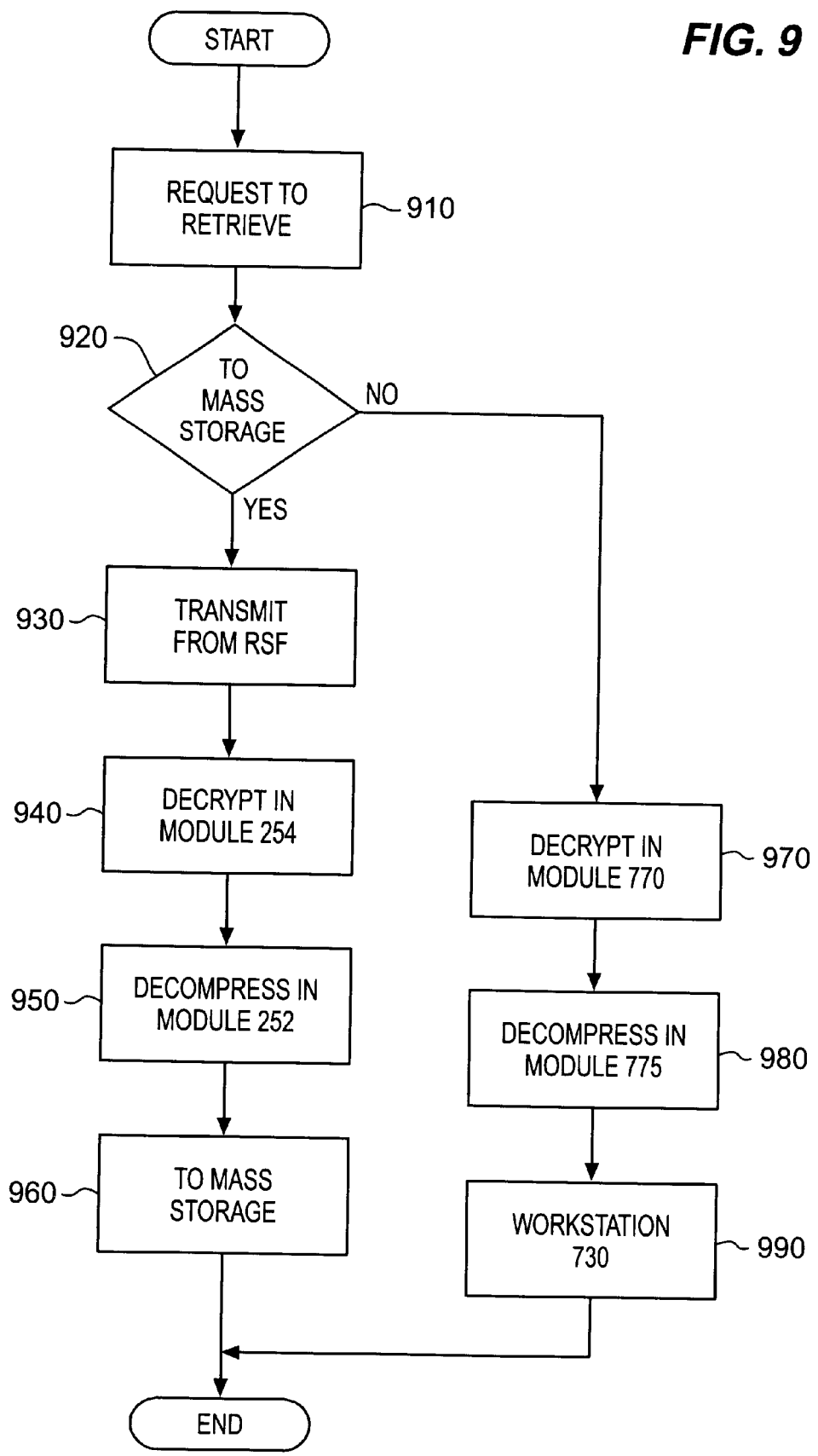
FIG. 9 illustrates a flow diagram for retrieving document image data according to an alternative embodiment of the present invention.

FIG. 9 illustrates a flow diagram for the document retrieval process performed by workstation 730. At step 910, an index selection is made at workstation 730 in order to retrieve a document. As previously mentioned, a user may generate a retrieval request for a document to be transferred to either workstation 730 or multifunction machine 120 for storage. Thus, at step 920, a determination is made as to whether the document is to be forwarded to mass storage 251 in multifunction machine 120 or workstation 730.

If the request is for the document to be forwarded to mass storage 251, image data is transmitted to multifunction machine 120 from RSF 360, step 930. Next, the image data is decrypted at decryption module 254, step. 940. The image data is then decompressed at compression/decompression module 252, step 950. At step 960, the image data is written to mass storage medium 251. If the request is for the document to be forwarded to workstation 730, the image data is transmitted to decrypt module 770 for decryption, step 970. Next, the image data is decompressed at compression module 775, step 980. Finally, at step 990, the requested document is forwarded to workstation 730 where it may be inspected by the system user.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from the spirit and essential characteristics. References to details of particular embodiments are not intended to limit the scope of the claims.

What is claimed is:

1. A document image storage system comprising:

a bus;

a multifunction machine, coupled to the bus, including a control to receive a plurality of electronic document images via the bus, each of the plurality of electronic document images having an origination identifier indicating from which device a document was transmitted and a destination identifier indicating the multifunction machine is the destination of the document, the control to monitor the bus for the document being transferred thereon for the destination identifier indicating the address of the document image storage system; and a peripheral device, coupled to the bus, having:

scanning engine to receive at least one of the plurality of documents to produce the electronic document image data;

a printing engine to produce a hardcopy of said electronic image data; and an image data tap to transmit the electronic document image data to the multifunction machine to perform unconscious capture archiving, wherein responsive to receiving at least one of a plurality of documents, the scanning engine is operable to perform a scanning operation on the document to form the electronic document image data, with the image data tap being operable to relay the image data to the multifunction machine, and the printing engine prints a hardcopy document based on the electronic document image data, wherein the scanning engine, printing engine and image data tap function without input from a user to capture electronic document image data of each and every document produced by the peripheral device.

2. The document image storage system of claim 1, further comprising a remote storage facility coupled to the multifunction machine.

3. The document image storage system of claim 2, wherein the remote storage facility comprises:

a storage medium; and an image notarization module to notarize document images that are received by the remote storage facility.

4. The document image storage system of claim 2, wherein the multifunction machine communicates with the remote storage facility via a Wide Area Network.

5. The document image storage system of claim 4, wherein the multifunction machine includes a first modem and the remote storage facility includes a second modem, wherein the multifunction machine and the remote storage facility communicate via the first and second modems.

6. The document image storage system of claim 2, further comprising a workstation to retrieve document images.

7. The document image storage system of claim 2, further comprising a recordable CDROM system to externally store document images.

8. The document image storage system of claim 2, wherein the remote storage facility comprises:

a communication medium;

an image notarization module notarizes data received by the remote storage facility; and a storage medium, the remote storage facility to archive data received from the multifunction machine via the communication medium.

9. The document image storage system of claim 8, wherein the storage medium is configured in a hierarchical arrangement.

10. The document image storage system of claim 8, wherein the remote storage facility is coupled to a workstation to retrieve document images.

11. The document image storage system of claim 8, wherein the remote storage facility is coupled to a recordable CDROM system to externally store document images.

12. The document image storage system of claim 8, wherein the communication medium is a Wide Area Network connection.

13. The document image storage system of claim 1, wherein the multifunction machines further comprises:

a mass storage medium coupled to the control;

a compression/decompression module coupled to the mass storage medium;

an encryption module coupled to the compression/decompression module; and a decryption module coupled to the compression/decompression module.

14. The document image storage system of claim 1, wherein the peripheral device is a digital copier.

15. The document image storage system of claim 1, wherein the peripheral device is a facsimile machine.

16. A method comprising:

receiving a plurality of documents at a peripheral device having a scanning engine, a printing engine and an image data tap;

scanning at least one of the plurality of documents at the scanning engine to produce electronic document image data, the document image having an origination identifier indicating from which device the document was transmitted and a destination identifier indicating that the multifunction machine is the destination of the document;

transmitting the electronic document image data from the image data tap to a multifunction machine to perform unconscious capture archiving; and producing a hardcopy of the electronic image data at the printing engine; wherein the scanning engine, printing engine and image data tap function without input from a user to capture electronic document image data of each and every document produced by the peripheral device.

17. The method of claim 16 further comprising:

transmitting the document image from the multifunction machine to a remote storage facility; and processing the document image at the remote storage facility.

18. The method of claim 17, wherein transmitting the document image from the multifunction machine further comprises:

compressing the document image; and encrypting the document image.

19. The method of claim 17, wherein processing the document image further comprises:

notarizing the document image; and archiving the document image.

20. The method of claim 17, wherein the document image is transmitted from the multifunction machine to the remote storage facility immediately after the document image is received at the multifunction machine.

21. The method of claim 17, wherein transmission from the multifunction machine to the remote storage facility occurs at predetermined intervals.

* * * * *